(12) United States Patent
Tripathi

(10) Patent No.: US 7,859,811 B2
(45) Date of Patent: Dec. 28, 2010

(54) MODULAR COMMUNICATION PLUG-IN MODULE FOR AN ELECTRONIC TRIP UNIT

(75) Inventor: Dinesh Tripathi, Uttar Pradesh (IN)

(73) Assignee: General Electric Company, Schenectady, NY (US)

( * ) Notice: Subject to any disclaimer, the term of this patent is extended or adjusted under 35 U.S.C. 154(b) by 697 days.

(21) Appl. No.: 11/857,752

(22) Filed: Sep. 19, 2007

(65) Prior Publication Data

US 2009/0072022 A1 Mar. 19, 2009

(51) Int. Cl.
*H02H 7/00* (2006.01)
(52) U.S. Cl. ..................................... 361/93.1
(58) Field of Classification Search ................. 361/93.1
See application file for complete search history.

(56) References Cited

U.S. PATENT DOCUMENTS 4,870,531 A 9/1989 Danek
5,539,605 A * 7/1996 Pollman et al. ............... 361/92

FOREIGN PATENT DOCUMENTS

EP 1294068 A2 3/2003

* cited by examiner

*Primary Examiner*—Stephen W Jackson
(74) *Attorney, Agent, or Firm*—Cantor Colburn LLP

(57) ABSTRACT

The present invention relates to a communication module plug-in device for an electronic trip unit including both wired and wire-less conventional communication methodologies. The device comprising a housing, the housing being structurally configured for the releasable connection to an electronic trip unit, wherein the housing further facilitates the electronic communication between the communication plug-in device and the electronic trip unit. The device also comprises a communication controller that is situated within the housing, a transceiver situated within the housing, wherein the transceiver is in communication with the communication controller, and a memory storage device situated within the housing, the memory storage device being in communication with the communication controller and the transceiver.

15 Claims, 2 Drawing Sheets

MODULAR COMMUNICATION PLUG-IN MODULE FOR AN ELECTRONIC TRIP UNIT

FIELD OF THE INVENTION

This invention relates to circuit interrupting devices comprising electronic tripping units, and particularly to plug-in modules configured to expand the functional operations of the electronic trip units.

DESCRIPTION OF BACKGROUND

Electronic trip units implemented within circuit breakers have been utilized to perform a plurality of functional operations. Many electronic trip units employ microprocessors for the execution of instructional operations pertaining to the monitoring and gathering of systematic information, such information including information in regard to environmental and performance standards that may affect a circuit breaker. Since the operational performance standards of a circuit breaker operating in the field may change over time, the information or software that is needed to diagnose or update a currently configured operational function within the microprocessor may change.

Thus, there exists a need for a solution for updating software and performance standard information within an electronic trip unit of a circuit breaker.

SUMMARY OF THE INVENTION

Exemplary embodiments of the present invention comprise a communication module plug-in device for an electronic trip unit. The device comprising a housing, the housing being structurally configured for the releasable connection to an electronic trip unit, wherein the housing further facilitates the electronic communication between the communication plug-in device and the electronic trip unit. The device also comprises a communication controller that is situated within the housing, a transceiver situated within the housing, wherein the transceiver is in communication with the communication controller, and a memory storage device situated within the housing, the memory storage device being in communication with the communication controller and the transceiver.

A further exemplary embodiment of the present invention comprises a system for the communication between an electronic trip unit and a communication device. The system comprises an electronic trip unit, the electronic trip unit comprising a housing, the housing being structurally configured for the releasable connection to a modular plug-in device, and a microcontroller situated within the housing. The system further comprises a communication module plug-in device in electrical communication with the electronic trip unit. The communication plug-in device comprising a housing, the housing being structurally configured for the releasable connection to an electronic trip unit, wherein the housing further facilitates the electronic communication between the communication plug-in device and the electronic trip unit, a communication controller situated within the housing, a transceiver situated within the housing, wherein the transceiver is in communication with the communication controller; and a memory storage device situated within the housing, the memory storage device being in communication with the communication controller and the transceiver.

A yet further exemplary embodiment of the present invention comprises the inclusion of conventional wired and wireless communication mechanisms that are practiced in industry. The exemplary plug-in communication device of the present invention comprises all the capability required—electronic, electrical and mechanical mentioned as a part of this invention—to facilitate an array of plug-in communication devices where in only one plug-in communication device is necessitated to be releasably connected to an electronic trip unit at a time.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

Figure 1:
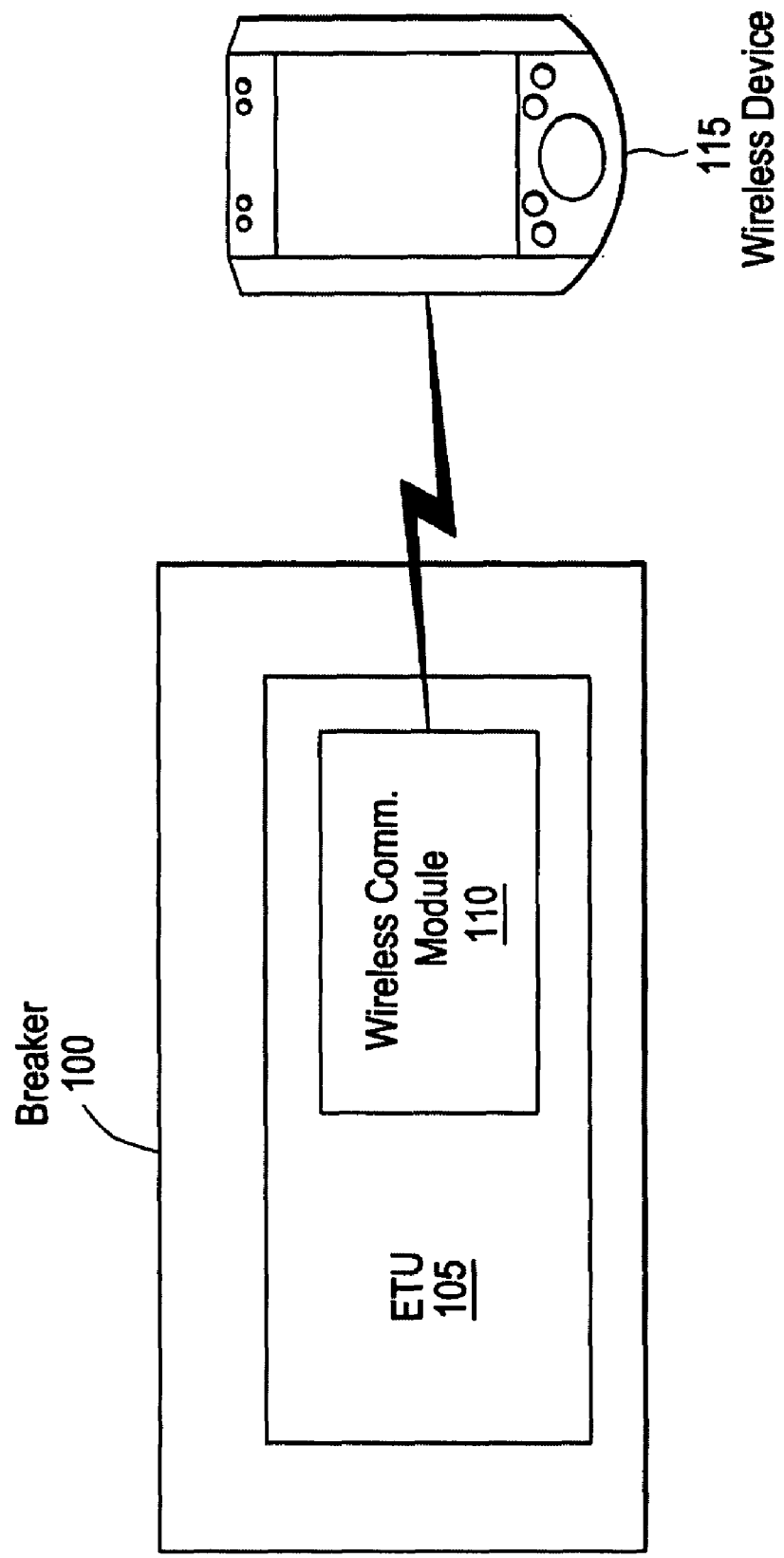
FIG. 1 is a diagram of a circuit breaker system and the sub-parts of the circuit system in accordance with exemplary embodiments of the present invention.

The detailed description explains the exemplary embodiments of the invention, together with advantages and features, by way of example with reference to the drawings.

DETAILED DESCRIPTION OF THE INVENTION

One or more exemplary embodiments of the invention are described below in detail. The disclosed embodiments are intended to be illustrative only since numerous modifications and variations therein will be apparent to those of ordinary skill in the art. In reference to the drawings, like numbers will indicate like parts continuously throughout the views.

It is typical for an electronic trip unit to be sold with additional functions that are not part of the standard commercial offering for the electronic trip unit. Traditionally, these additional functions may be offered as upgrades to the electronic trip unit and may be enabled within the electronic trip unit prior to the shipping of the product at the request of a customer. However, problems may occur in the event that a customer desires to upgrade the functions of the electronic trip unit or add differing functionality to an electronic trip unit that has already been delivered to the customer.

Exemplary embodiments of the present invention provide for an add-on communication module for operational usage with an electronic trip unit. The communication plug-in module is provided as a solution for the installation of desired operational electronic trip unit functionality in the field. As such, the electronic trip unit is configured to have a common interface bus that serves to cater to a plethora of communication plug-in module housing connector configurations. Further, the communication plug-in module is configured to communicate to a user data signals that are fed to it as well as communicate the data signals to a main microcontroller of main device i.e. an electronic trip unit. This communicative aspect is accomplished within exemplary embodiments of the present invention via the implementation of a communication controller or a combination of equivalent circuitry.

The communication capabilities of a communication plug-in module can be provided by the implementation of a communication controller or a combination of equivalent circuitry—the equivalent circuitry being known to one of ordinary skill in the art. Further, individual communication plug-in modules can be identified by an electronic trip unit by the means of a unique electronic identification code that is assigned to each communication plug-in module. When a communication plug-in module is connected to an electronic trip unit, upon the electronic trip unit recognizing the identification code of a communication plug-in module, a set of instructions that is stored upon the device can thereafter be accessed and executed to serve the purposes of the connected communication plug-in module.

Further exemplary embodiments of the present invention provide for an efficient, stand-alone, reliable communication plug-in module. The communication plug-in module can be presented as an independent and separate component in order to provide additional functionality for an electronic trip unit. Further, the communication plug-in module provides a simple solution for an operator to install desired operational electronic trip unit functionality in the field.

Further aspects of the exemplary embodiments of the present invention detail the communication module, the communication plug-in module being configured to convert microcontroller data to ready-to-transmit communication protocol compatible data. Similarly, communication data received at the communication plug-in module is formatted into microcontroller data, which is then passed to microcontroller.

FIG. 1 shows a diagram of a circuit breaker 100 system, wherein the circuit breaker 100 comprises an electronic trip unit 105 and a plug-in communication module 110. The electronic trip unit 105 and the communication module 110 are both comprised within separate housing enclosures, wherein the electronic trip unit 105 and the communication module 110 are physically releasably connected by conventional structural plug-in housing connection means. Thus, the communication module 110 can be configured as a plug-in module that can be physically attached to the electronic trip unit 105 before or after the complete assembly of the breaker 100; even in the event that the breaker 100 is in the field.

Figure 2:
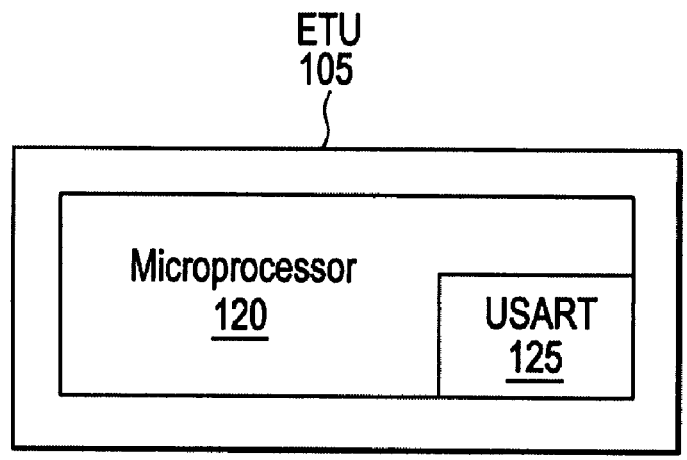
FIG. 2 is a diagram of an electronic trip unit implemented in accordance with exemplary embodiments of the present invention.
Figure 3:
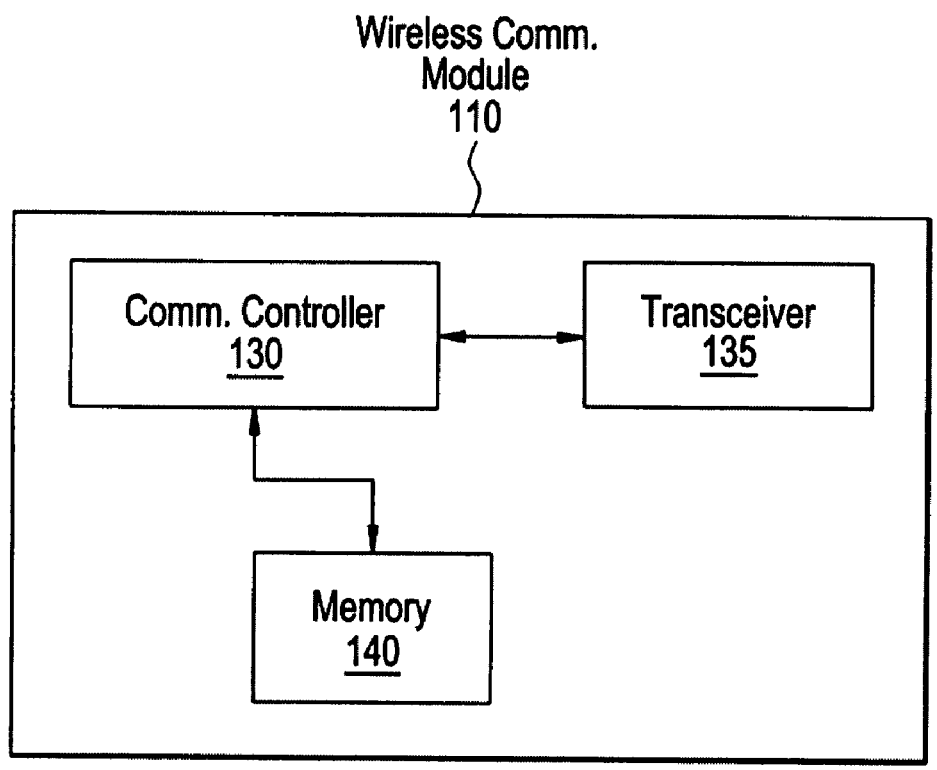
FIG. 3 is a diagram of a communication module plug-in device implemented in accordance with exemplary embodiments of the present invention.

The electronic trip unit further comprises a microcontroller 120, wherein the microcontroller 120 comprises a universal synchronous/asynchronous receiver/transmitter (USART) 125 (FIG. 2). The USART 125 is employed for the reception and transmittal of serial data from the communication controller 130 of the communication module 110 (FIG. 3). Internally, the communication controller 130 communicates with the microcontroller 120 using the USART 125 lines. The communication controller 130 communicates with an external device 115 through a transceiver 135. The transceiver 135 is utilized to facilitate communication with remote devices (that is, a PDA, laptop computer, cell phone, for example). The communication module 110 further comprises a memory 140 (for example, flash memory or a non-flash EEPROM) that is in communication with the communication controller 130.

The microprocessor 120 of the electronic trip unit 105 executes software instructions stored within its internal memory or downloaded to its memory (not shown). The memory of the electronic trip unit comprises a look-up table that comprises the unique electronic identification codes for each communication module 110 and the array of software instructions that are associated with the communication module 110, thus supporting the functions of the communication module 110.

Each communication module 110 is assigned a unique identification code. This unique identification code is programmed into the electronic trip unit 105. The unique identification code for a communication module 110 is further associated with at least one set of software instructions that has been pre-programmed into the electronic trip unit 105. The electronic trip unit 105 utilizes the unique identification code for a communication module 110 to "unlock" the pre-programmed software instructions that are associated with the unique identification code of the communication module 110. Updates for software instructions for the electronic trip unit 105 can be downloaded from a device to the communication module 110 for further downloading to the electronic trip unit 105.

Data that can be uploaded or downloaded from the electronic trip unit 105 to a device 115 include, but are not limited to: the configuration parameters for the electronic trip unit 105, the monitoring on-line parameters, supervisory control commands operations, and electronic optioning parameters. Further, the automated testing of the electronic trip unit may be performed from a communicating device 115 via the communication module 110. The data downloaded from the electronic trip unit 105 via the communication module 110 can be presented to a device 115 user at the device. Further, the data that is uploaded from the device to the electronic trip unit 105 via the communication module 110 can be delivered to the microcontroller 120.

Within exemplary embodiments of the present invention communication between the electronic trip unit 105 and a device 115 are facilitated via the communication module 110. Within the present invention communication can be accomplished using a wide variety of conventional communication protocols (e.g., RF-inclusive of the entire frequency range, short range radio frequency technologies such as Bluetooth, and infrared technologies).

Within further exemplary embodiments of the present invention communication between an electronic trip unit 105 and a device 115 can be facilitated via the communication module 110 and the device 115, wherein each device comprises an appropriate physically compatible interface for communication. Communication between the devices can be accomplished over a physical interface via serial communication (e.g., implementing the use of conventional communication methodologies such as Fieldbus, RS-232, or RS-485 physical links over any conventional industry standard or proprietary protocol) and Ethernet communication (e.g., HTTP, TCP/IP, SNMP, etc. . . . ). Yet further exemplary embodiments the devices can be configured for physical or wireless parallel communication data linkage in order to facilitate communication between the communication module 110 and a device 115.

For the further explanatory purposes of the present invention exemplary embodiments detailing communication via infrared technology will be discussed. The electronic trip unit 105 has a common bus of interface signals, wherein a variety of communication plug-in modules 110 are supported. Each communication module 110 comprises an electronic assembly that provides the resource for an electronic trip unit 105 to communicate to an IrDA compatible hand held device that is configured with an infrared communication link.

Within an infrared communication implementation, the communication module 110 comprises an infrared communication controller 130 and an infrared transceiver 135 to receive or transmit data through an infrared channel. The communication controller 130 further comprises the IrDA communication protocol stack, a RAM for buffering data, and means for communicating with the microprocessor 120 of the main electronic trip unit assembly 105. Data that is to be transferred on a point-to-point link between the electronic trip unit 105 and the communication module 110 is wrapped into a predetermined industry standard communication protocol format. This implementation has the benefit of almost no impact on the main memory of the communication module 110, which also comprises the executable code of the module 110. Communication on an infrared physical medium provides highly reliable, point-to-point, high-speed data transfer, in addition to being suitable for noise-prone environments.

The communication module 110 provides an electronic trip unit 105 with a communicative capacity. Whereas the communication module 110 serves to encode and decode communication information that is received and transmitted to a device 115 via the transceiver 135 of the communication module 110. As such, any circuit breaker 100 system that is configured to accept the communication module plug-in 110 can be customized to perform a plethora of optional preset or upgraded operational functions.

As described, the present invention provides simple, low-cost, stand alone communication module. The communication module can be provided in conjunction with a circuit breaker/electronic trip unit system or as a separate ad-on functional component to the circuit breaker system in the field.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims.

The invention claimed is:

1. A communication module plug-in device for an electronic trip unit, comprising:
    a housing, the housing being structurally configured for a releasable connection to an electronic trip unit, wherein the housing facilitates electronic communication between the communication module plug-in device and the electronic trip unit;
    a communication controller situated within the housing;
    a transceiver situated within the housing, wherein the transceiver is in communication with the communication controller; and
    a memory storage device situated within the housing, the memory storage device being in communication with the communication controller and the transceiver, the memory storage device storing a unique electronic code associated with the communication module plug-in device, the unique electronic identification code being further associated with at least one set of software instructions that are stored in a memory of the electronic trip unit, the communication controller being configured to deliver the unique identification code to the electronic trip unit, and the electronic trip unit being configured to access the at least one set of software instructions that utilizes the unique electronic identification code.

2. The device of claim 1, wherein the transceiver is configured to facilitate the communication between a remote device and the electronic trip unit.

3. The device of claim 2, wherein the communication controller is in electrical communication with a microcontroller comprised within the electronic trip unit.

4. The device of claim 1, wherein the communication module plug-in device is configured for wired communication with a communication device.

5. The device of claim 1, wherein the communication module plug-in device is configured for wireless communication with a communication device.

6. A system for the communication between an electronic trip unit and a communication device, the system comprising:
    an electronic trip unit, the electronic trip unit comprising:
    a housing, the housing being structurally configured for the releasable connection to a modular plug-in device;
    a microcontroller situated within the housing;
    a communication module plug-in device in electrical communication with the electronic trip unit, the communication plug-in device comprising:
    a second housing, the second housing being structurally configured for the releasable connection to the electronic trip unit, wherein the second housing facilitates electronic communication between the communication plug-in device and the electronic trip unit;
    a communication controller situated within the second housing;
    a transceiver situated within the second housing, wherein the transceiver is in communication with the communication controller; and
    a memory storage device situated within the second housing, the memory storage device being in communication with the communication controller and the transceiver.

7. The system of claim 6, wherein the plug-in device is associated with a unique electronic identification code, the unique electronic identification code being stored at the device.

8. The system of claim 7, wherein the transceiver facilitates communication between a remote device and the electronic trip unit.

9. The system of claim 8, wherein the communication controller is in electrical communication with the microcontroller comprised within the electronic trip unit.

10. The system of claim 9, wherein the unique electronic identification code of the plug-in device is associated with at least one set of software instructions that are stored at a memory comprised within the electronic trip unit.

11. The system of claim 10, wherein the communication controller is configured to deliver the unique electronic identification code to the electronic trip unit.

12. The system of claim 11, wherein the microcontroller utilizes the delivered and received unique electronic identification code to identify and access the at least one set of software instructions that are associated with the unique electronic identification code.

13. The system of claim 12, wherein the microcontroller is configured to execute the at least one set of accessed software instructions that are associated with the unique electronic identification code.

14. The system of claim 13, wherein the communication module plug-in device is configured for wireless communication with a communication device.

15. The system of claim 13, wherein the communication module plug-in device is configured for wired communication with a communication device.

* * * * *